United States Patent
Mhaske et al.

(10) Patent No.: US 11,036,841 B1
(45) Date of Patent: Jun. 15, 2021

(54) SYSTEMS AND METHODS FOR DETECTING UNAUTHORIZED USE OF AN APPLICATION

(71) Applicant: Symantec Corporation, Mountain View, CA (US)

(72) Inventors: Sharad Subhash Mhaske, Ahmednagar (IN); Arif Mohammed Shaikh, Pune (IN); Shrikant Pawar, Mumbai (IN)

(73) Assignee: NortonLifeLock Inc., Tempe, AZ (US)

( * ) Notice: Subject to any disclaimer, the term of this patent is extended or adjusted under 35 U.S.C. 154(b) by 214 days.

(21) Appl. No.: 15/904,807

(22) Filed: Feb. 26, 2018

(51) Int. Cl.
| | |
|---|---|
| *G06F 7/04* | (2006.01) |
| *G06F 12/00* | (2006.01) |
| *G06F 12/14* | (2006.01) |
| *G06F 13/00* | (2006.01) |
| *G11C 7/00* | (2006.01) |
| *G06F 21/32* | (2013.01) |
| *G06F 21/62* | (2013.01) |

(52) U.S. Cl.
CPC .......... *G06F 21/32* (2013.01); *G06F 21/629* (2013.01)

(58) Field of Classification Search
CPC ... G06F 21/32; G06F 21/629; G06K 9/00087; G06K 9/00093; G06K 9/001
See application file for complete search history.

(56) References Cited

U.S. PATENT DOCUMENTS

| | | | |
|---|---|---|---|
| 8,660,322 B2 | 2/2014 | Tsai et al. | |
| 2001/0014883 A1* | 8/2001 | Yamane | G06F 21/78 |
| | | | 705/51 |
| 2014/0310804 A1* | 10/2014 | Apostolos | H04L 63/0861 |
| | | | 726/19 |
| 2015/0242605 A1 | 8/2015 | Du et al. | |
| 2015/0356286 A1* | 12/2015 | Quirk | H04L 9/3231 |
| | | | 726/19 |
| 2016/0042166 A1* | 2/2016 | Kang | G06F 21/32 |
| | | | 726/7 |
| 2016/0092018 A1* | 3/2016 | Lee | G06F 21/32 |
| | | | 345/173 |
| 2016/0364591 A1* | 12/2016 | El-Khoury | G06K 9/0002 |
| 2017/0316250 A1* | 11/2017 | Roh | G06K 9/00087 |
| 2018/0075273 A1* | 3/2018 | Vissa | G06F 1/3234 |
| 2018/0260544 A1* | 9/2018 | Jammalamadaka | G06F 21/32 |

OTHER PUBLICATIONS

Google; Google Scholar search for "continuous authentication"; Feb. 21, 2018.

* cited by examiner

*Primary Examiner* — Trong H Nguyen
(74) *Attorney, Agent, or Firm* — FisherBroyles, LLP

(57) ABSTRACT

The disclosed computer-implemented method for detecting unauthorized use of an application may include (1) receiving, by the computing device, fingerprint data associated with a fingerprint, where the fingerprint data is received from the touchscreen, when a user interface of the application is displayed on the touchscreen, and in an absence of displaying a request for fingerprint data on the touchscreen, (2) comparing the received fingerprint data to a whitelist of authorized fingerprint data to determine a presence of a match, where the authorized fingerprint data indicates at least one fingerprint of at least one user that is authorized to access the application and (3) performing, when the received fingerprint data does not match the whitelist of authorized fingerprint data, a security action. Various other methods, systems, and computer-readable media are also disclosed.

20 Claims, 6 Drawing Sheets

SYSTEMS AND METHODS FOR DETECTING UNAUTHORIZED USE OF AN APPLICATION

BACKGROUND

Applications running on computing devices are often protected by authentication techniques to prevent unauthorized access. Such authentication techniques may include requiring users to enter authorized personal identification numbers (PINS), patterns, and fingerprints to enable access to applications. These authentication techniques are often required during an authentication phase prior to enabling access to applications. However, after completing the authentication phase and enabling access to applications, continuing access often does not require subsequent or additional user authentications. Thus, unauthorized users may gain access to otherwise secure applications if authorized users leave computing devices unattended or computing devices are stolen post-authentication. The instant disclosure, therefore, identifies and addresses a need for systems and methods for detecting unauthorized use of an application.

SUMMARY

As will be described in greater detail below, the instant disclosure describes various systems and methods for detecting unauthorized use of an application.

In one example, a method for detecting unauthorized use of an application may include (1) receiving, by a computing device, fingerprint data associated with a fingerprint, where the fingerprint data is received from the touchscreen, when a user interface of the application is displayed on the touchscreen, and in an absence of displaying a request for fingerprint data on the touchscreen, (2) comparing the received fingerprint data to a whitelist of authorized fingerprint data to determine a presence of a match, where the authorized fingerprint data indicates at least one fingerprint of at least one user that is authorized to access the application, and (3) performing, when the received fingerprint data does not match the whitelist of authorized fingerprint data, a security action.

In examples, the received fingerprint data may be received for every finger contact of the touchscreen in a region of the touchscreen displaying the user interface. In further examples, comparing the received fingerprint data may include determining a percentage of received fingerprint data features that match authorized fingerprint data features, and determining that the received fingerprint data does not match the whitelist of authorized fingerprint data when the percentage fails to meet a threshold percentage. In some embodiments, the security action may include at least one of stopping access to the application, stopping the application, locking the computing device, and displaying a message on the touchscreen indicating that the application is locked.

Moreover, the method may include reversing the security action in response to receiving an unlock command indicating an authorized user. In further examples, the method may include storing the received fingerprint data that does not match the whitelist of authorized fingerprint data. In some embodiments, the method may include maintaining the security action after the computing device is power-cycled.

In one embodiment, a system for detecting unauthorized use of an application may include several modules stored in memory, including (1) a receiving module that receives fingerprint data associated with a fingerprint, where the fingerprint data is received from a touchscreen, when a user interface of the application is displayed on the touchscreen, and in an absence of displaying a request for fingerprint data on the touchscreen, (2) a comparing module that compares the received fingerprint data to a whitelist of authorized fingerprint data to determine a presence of a match, wherein the authorized fingerprint data indicates at least one fingerprint of at least one user that is authorized to access the application, and a performing module that performs, when the received fingerprint data does not match the whitelist of authorized fingerprint data, a security action, as well as at least one physical processor that executes the receiving module, the comparing module, and the performing module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) receive fingerprint data associated with a fingerprint, where the fingerprint data is received from a touchscreen, when a user interface of the application is displayed on the touchscreen, and in an absence of displaying a request for fingerprint data on the touchscreen, (2) compare the received fingerprint data to a whitelist of authorized fingerprint data to determine a presence of a match, where the authorized fingerprint data indicates at least one fingerprint of at least one user that is authorized to access the application, and (3) perform, when the received fingerprint data does not match the whitelist of authorized fingerprint data, a security action.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
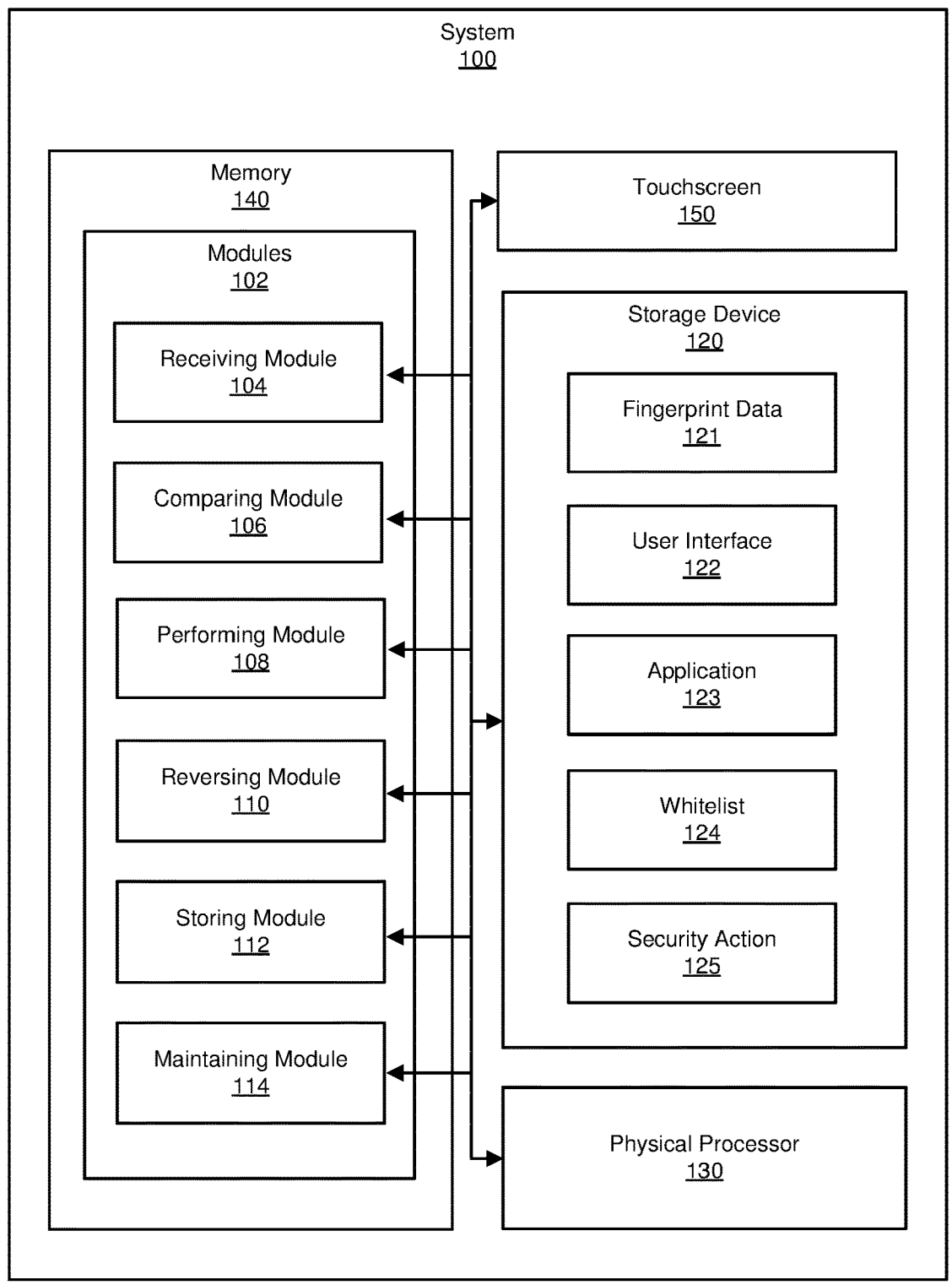
FIG. 1 is a block diagram of an example system for detecting unauthorized use of an application.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for detecting unauthorized use of an application. As will be explained in greater detail below, the techniques described herein may automatically detect the unauthorized use of applications subsequent to proper authorization to access the same. In examples, the disclosed systems and methods detect the unauthorized use of the applications by sensing users' fingerprints on touchscreens while the users interact with the applications. The fingerprints are converted to fingerprint data which the systems and methods compare to whitelists of authorized fingerprint data and/or blacklists of unauthorized fingerprint data to determine if the users are authorized. The disclosed techniques may be utilized in connection with a variety of applications running on computing devices, such as email applications, instant messaging (IM) applications, social networking applications, text messaging applications, phone applications, and the like. Upon identifying unauthorized access, the disclosed systems may at perform at least one security action to stop further unauthorized access.

By doing so, the systems and methods described herein may improve the security of computing devices and/or provide targeted protection against unauthorized access to applications. Examples of computing devices in which the provided techniques may be implemented include, and are not limited to, laptop computers, tablet computers, desktop computers, wearable computing devices (e.g., smart watches, smart glasses), smartphone devices, and/or smart televisions. As such, the provided techniques may advantageously protect users by beneficially reducing occurrences of unauthorized access to applications by unauthorized users. Further, the systems and methods described herein may beneficially reduce occurrences of theft and unauthorized sharing of sensitive information as a result of unauthorized access to applications by unauthorized users.

Figure 2:
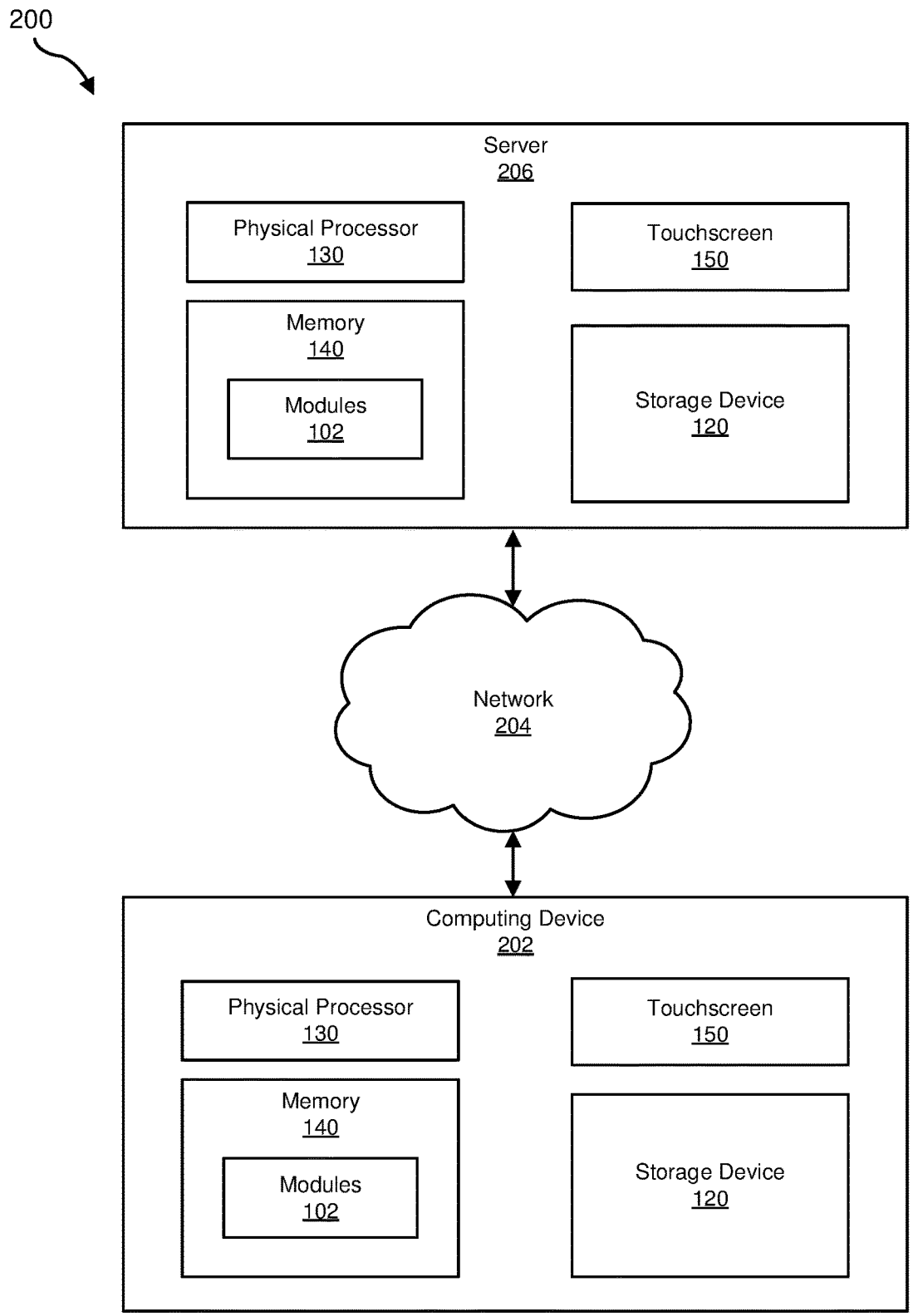
FIG. 2 is a block diagram of an additional example system for detecting unauthorized use of an application.

The following will provide, with reference to FIGS. 1-2, detailed descriptions of example systems for detecting unauthorized use of an application. Detailed descriptions of corresponding computer-implemented methods will also be provided in connection with FIGS. 3 and 4. In addition, detailed descriptions of an example computing system and network architecture capable of implementing one or more of the embodiments described herein will be provided in connection with FIGS. 5 and 6, respectively.

FIG. 1 is a block diagram of an example system 100 for detecting unauthorized use of an application. As illustrated in this figure, example system 100 may include one or more modules 102 for performing one or more tasks. As will be explained in greater detail below, modules 102 may include a receiving module 104, a comparing module 106, a performing module 108, a reversing module 110, a storing module 112, and a maintaining module 114. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more storage devices, such as storage device 120. Storage device 120 generally represents any type or form of volatile or non-volatile storage device or medium capable of storing data and/or computer-readable instructions. In one example, storage device 120 may store, load, and/or maintain information indicating one or more of fingerprint data 121, user interface 122, application 123, whitelist 124, and security action 125. Examples of storage device 120 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate detecting unauthorized use of an application. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more touchscreens 150. Touchscreen 150 may be a touch sensing device configured to receive input, such as fingerprint data 121, via users' touches. Touchscreen 150 may sense an intensity of users' touches on different portions of touchscreen 150 (i.e., multipoint sensing) such that touchscreen 150 may generate fingerprint data 121 corresponding to at least a portion of a fingerprint imparted by users on touchscreen 150 when users touch touchscreen 150. In examples, touchscreen 150 may implement technologies such as capacitive sensing, resistive sensing, pressure sensing, etc. Touchscreen 150 may also be an image (e.g., video) display device configured to display user interface 122 of application 123 and/or user warning 402 (depicted in FIG. 4). In embodiments, touchscreen 150 may be configured as an external display and fingerprint sensor for an additional computing device, such as a personal computer, a tablet computer, a wearable computing device, and/or the like.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to detect unauthorized use of an application. For example, and as will be described in greater detail below, one or more of modules 102 may cause computing device 202 and/or server 206 to recite steps of method claim using FIG. 2.

Computing device 202 generally represents any type or form of computing device capable of reading computer-executable instructions. For example, computing device 202 may represent an endpoint device running client-side software, such as authentication software. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, Internet-of-Things devices (e.g., smart appliances, etc.), variations or combinations of one or more of the same, and/or any other suitable computing device.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Server 206 generally represents any type or form of computing device that reads computer-executable instructions. For example, server 206 may represent a server running server-side software, such as authentication software. Additional examples of server 206 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, Internet-of-Things devices (e.g., smart appliances, etc.), security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

In some examples, computing device 202 may include touchscreen 150 and may be configured both to receive information from server 206 (e.g., whitelist 124) and to provide touchscreen data (e.g., fingerprint data 121) to server 206. Server 206 may then use this data to, for example, generate global whitelists and/or blacklists for use by additional computing devices. In embodiments, touchscreen 150 may be configured as an external display and fingerprint sensor for another computing device that is coupled to, but not integrated with, touchscreen 150, such as a personal computer, a tablet computer, a wearable computing device, and/or the like. For example, touchscreen 150 in computing device 202 may be configured as an external display and fingerprint sensor for server 206.

Figure 3:
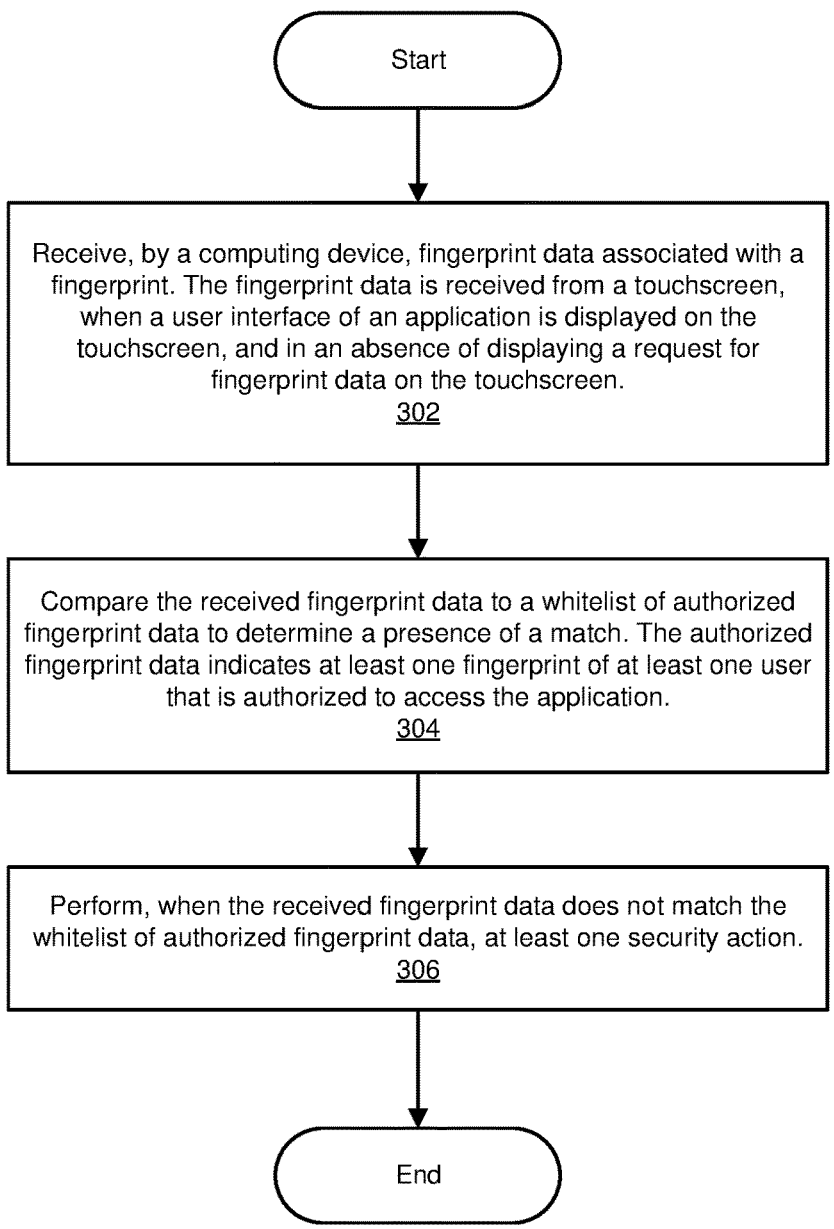
FIG. 3 is a flow diagram of an example method for detecting unauthorized use of an application.

FIG. 3 is a flow diagram of an example computer-implemented method 300 for detecting unauthorized use of an application. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

In an example, method 300 may be initiated by the start of a related application to be protected and/or may cease functioning when the application is stopped by an authorized user. In some embodiments, an authorized user may select certain applications to be protected by method 300 by configuring software implementing method 300.

As illustrated in FIG. 3, at step 302 one or more of the systems described herein may receive fingerprint data associated with fingerprints. Fingerprint data may be received from touchscreens, when user interfaces of applications are displayed on the touchscreens, and in the absence of displaying requests for fingerprint data on the touchscreens. The systems described herein may perform step 302 in a variety of ways. For example, receiving module 104 may, as part of computing device 202 in FIG. 2, receive fingerprint data 121 associated with fingerprints. Fingerprint data 121 may be received from touchscreen 150, when user interface 122 of application 123 is displayed on touchscreen 150, and in an absence of displaying a request for fingerprint data on touchscreen 150.

In additional examples, the received fingerprint data may be received for every finger contact of the touchscreen in a region of the touchscreen displaying the user interface. In other words, when an application is running following initial authorization to access the application, the received fingerprint data may be received for every finger contact of the touchscreen in a region of the touchscreen displaying the user interface (e.g., during a user's use) of the application. Thus, method 300 may, subsequent to initial authorization to access the application, determine if a current user is authorized as the application is used, instead of determining the same as part of a discrete authorization process. Alternatively, the received fingerprint data may be received for less than every finger contact of the touchscreen in the region of the touchscreen displaying the user interface.

The term "fingerprint data," as used herein, generally refers to digital information, such as biometric data, representing unique features of users' fingerprints on the users' fingers. The unique features are also known as fingerprint minutae and/or patterns. Examples of fingerprint data include, without limitation, fingerprint data 121 received from touchscreen 150, when user interface 122 of application 123 is displayed on touchscreen 150, such as in an absence of displaying a request for fingerprint data on touchscreen 150.

As illustrated in FIG. 3, at step 304 one or more of the systems described herein may compare the received fingerprint data to whitelists of authorized fingerprint data to determine the presence of matches. Comparing received fingerprint data to authorized fingerprint data may indicate a presence of at least one fingerprint of at least one user that is authorized to access applications. The systems described herein may perform step 302 in a variety of ways. For example, comparing module 106 may, as part of computing device 202 in FIG. 2, compare received fingerprint data 121 to whitelist 124 of authorized fingerprint data to determine the presence of a match. Authorized fingerprint data in whitelist 124 may indicate at least one fingerprint of at least one user that is authorized to access application 123 or is not authorized to access application 123. In examples, one or more of the systems described herein may compare received fingerprint data to blacklists of unauthorized fingerprint data to determine presence of matches with unauthorized users.

In one example, comparing received fingerprint data may include determining a percentage of received fingerprint data features that match authorized fingerprint data features and determining that the received fingerprint data does not match the whitelist of authorized fingerprint data when the percentage fails to meet a threshold percentage. Comparing a percentage of matching received fingerprint data features to a threshold may enable establishing a degree of authenticity necessary to access applications. The threshold (i.e., the degree of authenticity) may be adjusted to match a respective sensitivity of an application.

In embodiments, at least a portion of step 304 may be combined with a facial recognition technique to determine authorized use of applications and/or unauthorized use of applications.

As illustrated in FIG. 3, at step 306 one or more of the systems described herein may perform, when received fingerprint data does not match whitelists of authorized fingerprint data, or does match blacklists of authorized fingerprint data, various security actions. The systems described herein may perform step 302 in a variety of ways. For example, performing module 108 may, as part of computing device 202 in FIG. 2, perform, when received fingerprint data 121 does not match whitelist 124 of authorized fingerprint data, security action 125.

Figure 4:
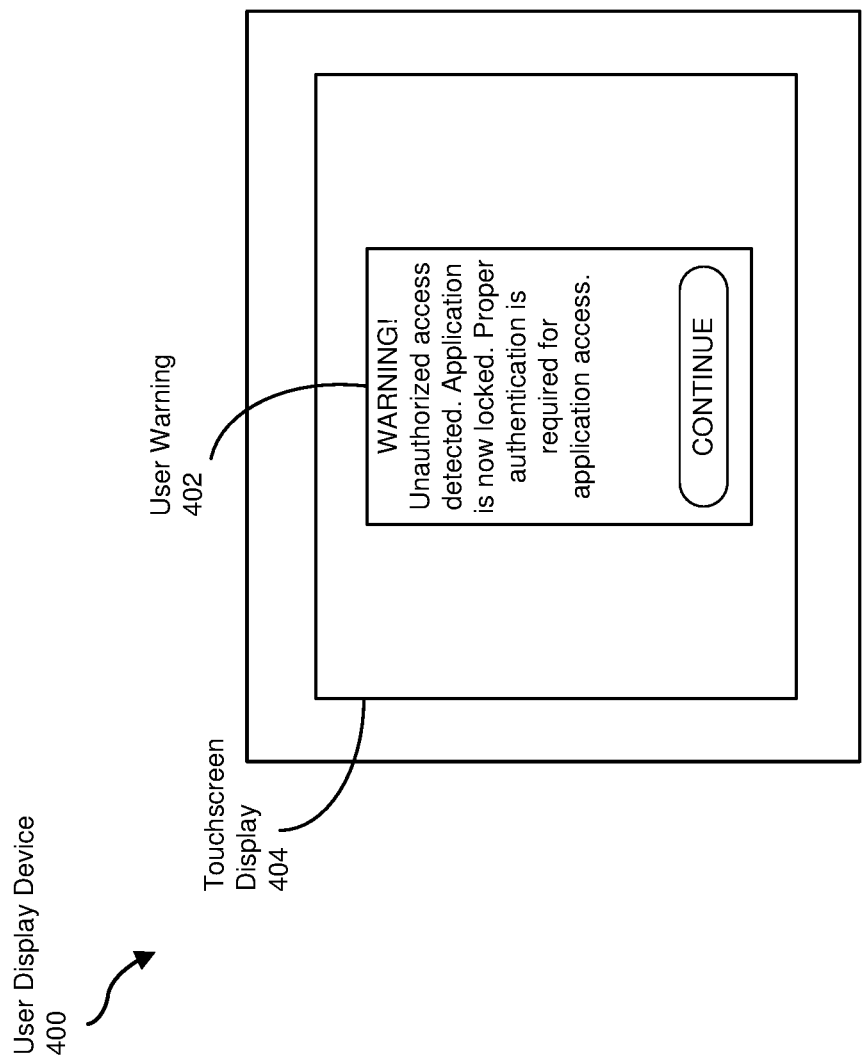
FIG. 4 is a block diagram of an example warning that may be displayed on a user display device.

Examples of security actions may include at least one of stopping access to an application (such as application 123), stopping the application, locking a computing device such as system 100, and/or displaying a message on the touchscreen indicating that the application is locked. FIG. 4 depicts an example of a user display device 400. In this example, user display device 400 may display a user warning 402 via a touchscreen display 404 (e.g., touchscreen 150) upon an application, such as application 123, being locked. Request for user warning 402 may warn a user of user display device 400 of application locking due to detecting unauthorized access. In some embodiments, user warning 402 may display options as to how to proceed and/or enable receiving input as to how to proceed.

Returning to FIG. 3, in some embodiments, a computing device may reverse a security action in response to receiving an unlock command indicating an authorized user. Unlock commands may be in a form of an authorized user entering an authorized personal identification number (PIN), providing an authorized fingerprint, providing an authorized facial scan, etc.

In some embodiments, a computing device may store received fingerprint data that does not match a whitelist of authorized fingerprint data. The received fingerprint data may be stored and/or transmitted to a component of a network architecture 600 (in FIG. 6) for forensic use, logging, and/or for identification of an unauthorized user. In examples, the techniques of method 300 may be integrated into malware protection software.

In some examples, security actions are maintained after a computing device is power-cycled. In other words, merely turning off-and-on a computing device in which a security action has been performed will not reset a security action implemented on the computing device prior to turning off the computing device.

Figure 5:
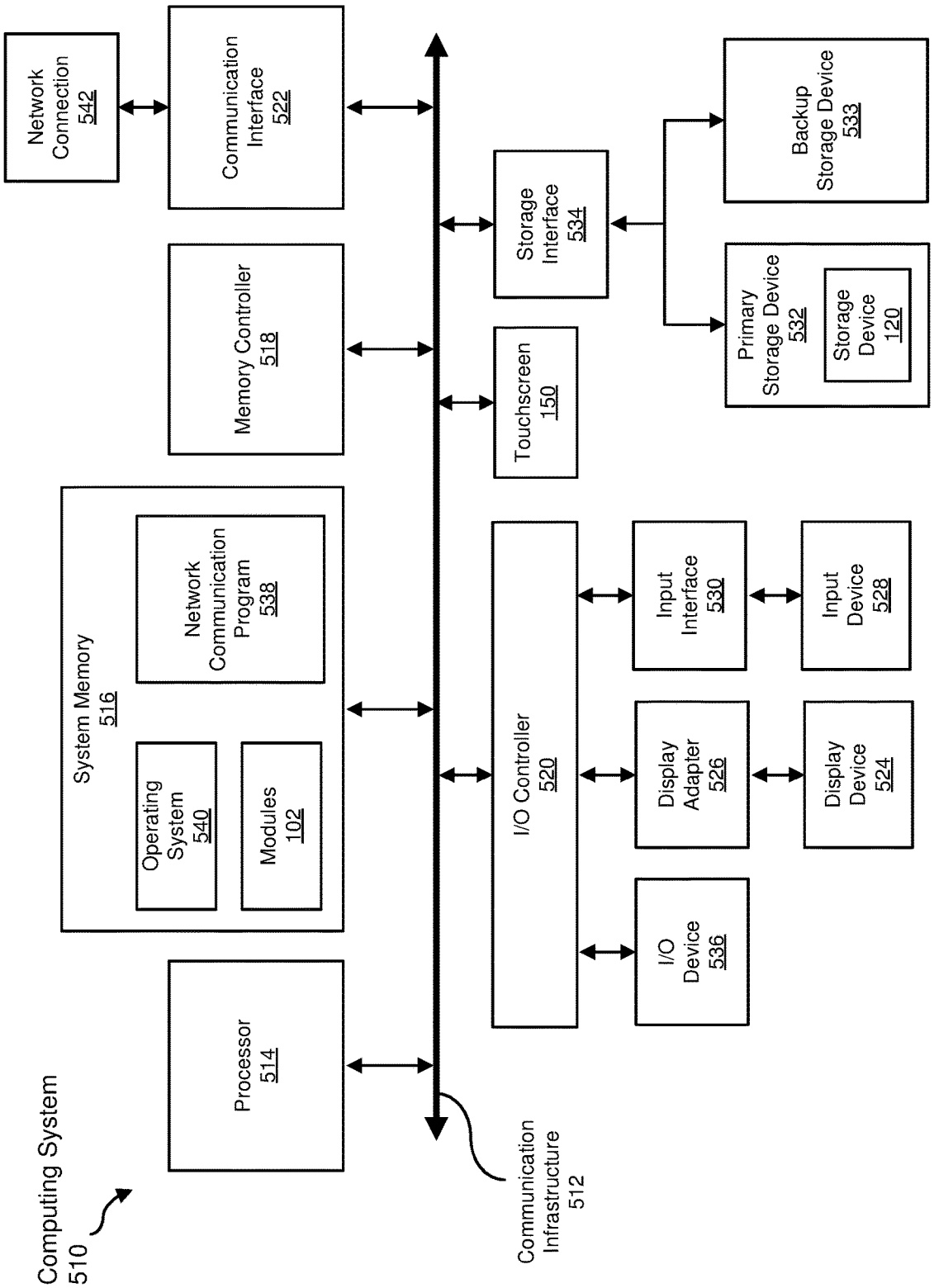
FIG. 5 is a block diagram of an example computing system capable of implementing one or more of the embodiments described and/or illustrated herein.

As detailed above, the steps outlined in method 300 in FIG. 3 may automatically detect unauthorized use of applications subsequent to proper authorization to access the applications. By doing so, the systems and methods described herein may protect users by beneficially reducing occurrences of unauthorized access to applications by unauthorized users FIG. 5 is a block diagram of an example computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the example embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In some examples, system memory 516 may store and/or load an operating system 540 for execution by processor 514. In one example, operating system 540 may include and/or represent software that manages computer hardware and software resources and/or provides common services to computer programs and/or applications on computing system 510. Examples of operating system 540 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

As illustrated in FIG. 5, computing system 510 may also include at least one display device 524 coupled to I/O controller 520 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, example computing system 510 may also include at least one input device 528 coupled to I/O controller 520 via an input interface 530. Input device 528 generally represents any type or form of input device capable of providing input, either computer or human generated, to example computing system 510. Examples of input device 528 include, without limitation, a keyboard, a pointing device, a speech recognition device, variations or combinations of one or more of the same, and/or any other input device.

Additionally or alternatively, example computing system 510 may include additional I/O devices. For example, example computing system 510 may include I/O device 536. In this example, I/O device 536 may include and/or represent a user interface that facilitates human interaction with computing system 510. Examples of I/O device 536 include, without limitation, a computer mouse, a keyboard, a monitor, a printer, a modem, a camera, a scanner, a microphone, a touchscreen device, variations or combinations of one or more of the same, and/or any other I/O device.

Communication interface 522 broadly represents any type or form of communication device or adapter capable of facilitating communication between example computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

In some examples, system memory 516 may store and/or load a network communication program 538 for execution by processor 514. In one example, network communication program 538 may include and/or represent software that enables computing system 510 to establish a network connection 542 with another computing system (not illustrated in FIG. 5) and/or communicate with the other computing system by way of communication interface 522. In this example, network communication program 538 may direct the flow of outgoing traffic that is sent to the other computing system via network connection 542. Additionally or alternatively, network communication program 538 may direct the processing of incoming traffic that is received from the other computing system via network connection 542 in connection with processor 514.

Although not illustrated in this way in FIG. 5, network communication program 538 may alternatively be stored and/or loaded in communication interface 522. For example, network communication program 538 may include and/or represent at least a portion of software and/or firmware that is executed by a processor and/or Application Specific Integrated Circuit (ASIC) incorporated in communication interface 522.

As illustrated in FIG. 5, example computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and

533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, storage device 120 from FIG. 1 may be at least a part of and/or loaded in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 510 may be configured as an Application Specific Integrated Circuit (ASIC) adapted to implement one or more of the example embodiments disclosed herein.

Figure 6:
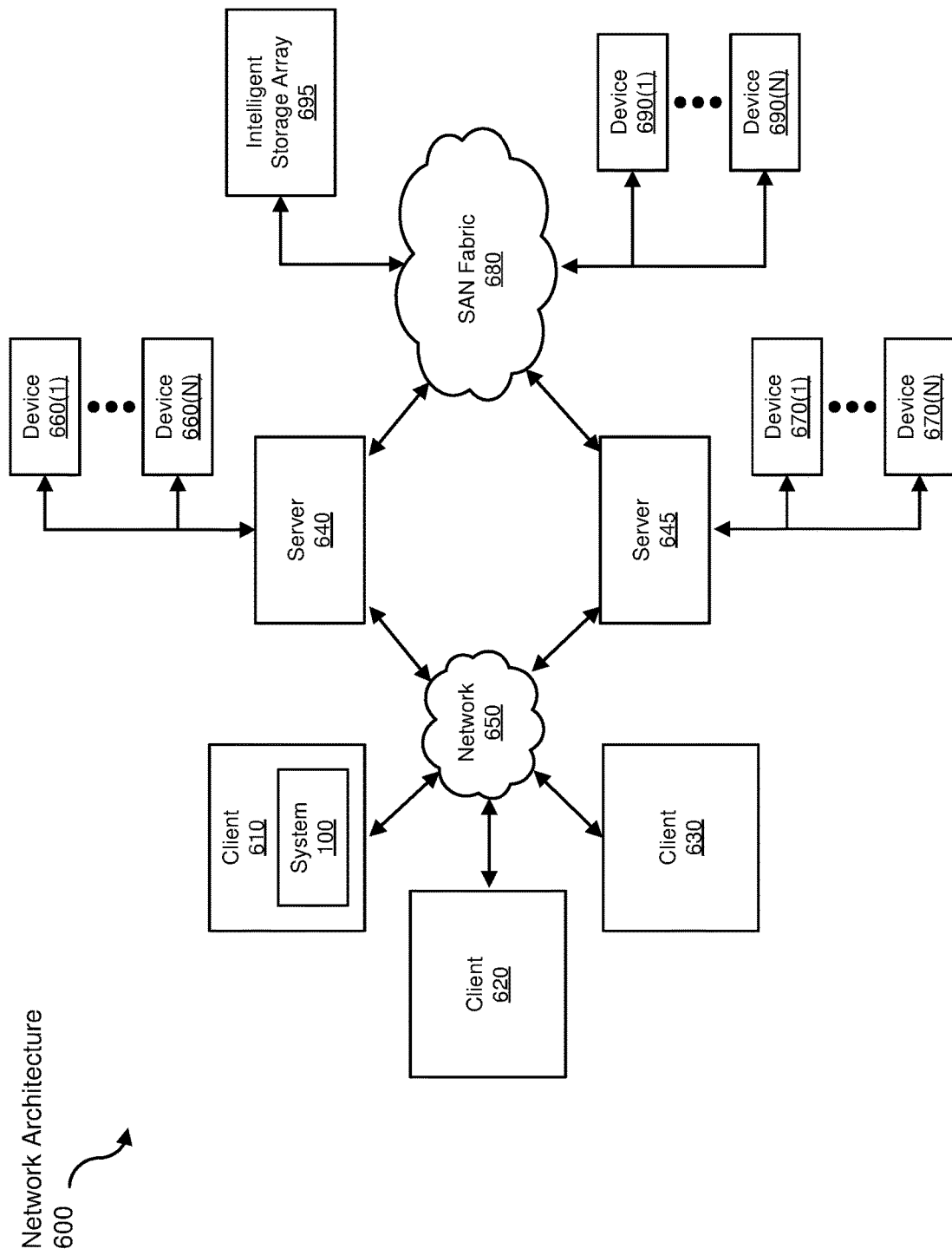
FIG. 6 is a block diagram of an example computing network capable of implementing one or more of the embodiments described and/or illustrated herein.

FIG. 6 is a block diagram of an example network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as example computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to example computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the example embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an example method for detecting unauthorized use of an application.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive fingerprint data to be transformed, transform the fingerprint data, output a result of the transformation to control performing a security action, use the result of the transformation to determine to perform a security action, and/or store the result of the transformation. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for detecting unauthorized use of an application, at least a portion of the method being performed by a computing device comprising a touchscreen and at least one processor, the method comprising:
   receiving, by the computing device, fingerprint data associated with a fingerprint, wherein:
      the fingerprint data is received from the touchscreen for less than every finger contact of the touchscreen, when a user interface of the application is displayed on the touchscreen, in an absence of displaying a request for the fingerprint data on the touchscreen, and when the application is running following an initial authorization to enable access to the application, and
      the fingerprint data is received as a part of a process other than a discrete authorization process;
   comparing the received fingerprint data to a whitelist of authorized fingerprint data received from a remote server to determine a presence of a match, wherein:
      the authorized fingerprint data indicates at least one fingerprint of at least one user that is authorized to access the application, and
      the received fingerprint data is provided to the remote server to generate a whitelist or blacklist for use by at least one additional computing device; and
   performing, when the received fingerprint data does not match the whitelist of authorized fingerprint data, a security action, wherein the received fingerprint data that does not match the whitelist of authorized fingerprint data is transmitted to a network device.

2. The computer-implemented method of claim 1, wherein the received fingerprint data is received for less than every finger contact of the touchscreen in a region of the touchscreen displaying the user interface.

3. The computer-implemented method of claim 1, wherein comparing the received fingerprint data includes:
   determining a percentage of received fingerprint data features that match authorized fingerprint data features; and
   determining that the received fingerprint data does not match the whitelist of authorized fingerprint data when the percentage fails to meet a threshold percentage.

4. The computer-implemented method of claim 1, wherein the security action includes at least one of stopping access to the application, stopping the application, locking the computing device, and displaying a message on the touchscreen indicating that the application is locked.

5. The computer-implemented method of claim 1, further comprising:
   reversing the security action in response to receiving an unlock command indicating an authorized user.

6. The computer-implemented method of claim 1, further comprising:
   storing the received fingerprint data that does not match the whitelist of authorized fingerprint data.

7. The computer-implemented method of claim 1, further comprising: maintaining the security action after the computing device is power-cycled.

8. A system for detecting unauthorized use of an application, the system comprising:
   a receiving module, stored in a memory, that receives fingerprint data associated with a fingerprint, wherein:
      the fingerprint data is received from a touchscreen for less than every finger contact of the touchscreen, when a user interface of the application is displayed on the touchscreen, in an absence of displaying a request for the fingerprint data on the touchscreen, and when the application is running following an initial authorization to enable access to the application, and
      the fingerprint data is received as a part of a process other than a discrete authorization process;
   a comparing module, stored in the memory, that compares the received fingerprint data to a whitelist of authorized fingerprint data received from a remote server to determine a presence of a match, wherein:

the authorized fingerprint data indicates at least one fingerprint of at least one user that is authorized to access the application, and the received fingerprint data is provided to the remote server to generate a whitelist or blacklist for use by at least one additional computing device;

a performing module, stored in the memory, that performs, when the received fingerprint data does not match the whitelist of authorized fingerprint data, a security action, wherein the received fingerprint data that does not match the whitelist of authorized fingerprint data is transmitted to a network device; and at least one physical processor that executes the receiving module, the comparing module, and the performing module.

9. The system of claim 8, wherein the received fingerprint data is received for less than every finger contact of the touchscreen in a region of the touchscreen displaying the user interface.

10. The system of claim 8, wherein comparing the received fingerprint data includes:
determining a percentage of received fingerprint data features that match authorized fingerprint data features; and
determining that the received fingerprint data does not match the whitelist of authorized fingerprint data when the percentage fails to meet a threshold percentage.

11. The system of claim 8, wherein the security action includes at least one of stopping access to the application, stopping the application, locking the system, and displaying a message on the touchscreen indicating that the application is locked.

12. The system of claim 8, further comprising:
a reversing module, stored in the memory, that reverses the security action in response to receiving an unlock command indicating an authorized user.

13. The system of claim 8, further comprising:
a storing module, stored in the memory, that stores the received fingerprint data that does not match the whitelist of authorized fingerprint data.

14. The system of claim 8, further comprising:
a maintaining module, stored in the memory, that maintains the security action after the system is power-cycled.

15. A non-transitory computer-readable medium comprising one or more computer-executable instructions that, when executed by at least one processor of a computing device, cause the computing device to:
receive fingerprint data associated with a fingerprint, wherein:
the fingerprint data is received from a touchscreen for less than every finger contact of the touchscreen, when a user interface of an application is displayed on the touchscreen, in an absence of displaying a request for the fingerprint data on the touchscreen, and when the application is running following an initial authorization to enable access to the application, and the fingerprint data is received as a part of a process other than a discrete authorization process;

compare the received fingerprint data to a whitelist of authorized fingerprint data received from a remote server to determine a presence of a match, wherein:
the authorized fingerprint data indicates at least one fingerprint of at least one user that is authorized to access the application, and
the received fingerprint data is provided to the remote server to generate a whitelist or blacklist for use by at least one additional computing device; and perform, when the received fingerprint data does not match the whitelist of authorized fingerprint data, a security action, wherein the received fingerprint data that does not match the whitelist of authorized fingerprint data is transmitted to a network device.

16. The non-transitory computer-readable medium of claim 15, wherein the received fingerprint data is received for less than every finger contact of the touchscreen in a region of the touchscreen displaying the user interface.

17. The non-transitory computer-readable medium of claim 15, wherein comparing the received fingerprint data includes:
determining a percentage of received fingerprint data features that match authorized fingerprint data features; and
determining that the received fingerprint data does not match the whitelist of authorized fingerprint data when the percentage fails to meet a threshold percentage.

18. The non-transitory computer-readable medium of claim 15, wherein the security action includes at least one of stopping access to the application, stopping the application, locking the computing device, and displaying a message on the touchscreen indicating that the application is locked.

19. The non-transitory computer-readable medium of claim 15, further comprising one or more computer-executable instructions that, when executed by the at least one processor of the computing device, cause the computing device to reverse the security action in response to receiving an unlock command indicating an authorized user.

20. The non-transitory computer-readable medium of claim 15, further comprising one or more computer-executable instructions that, when executed by the at least one processor of the computing device, cause the computing device to store the received fingerprint data that does not match the whitelist of authorized fingerprint data.

* * * * *